United States Patent
Liaom

(10) Patent No.: US 6,315,231 B1
(45) Date of Patent: Nov. 13, 2001

(54) MICRO-TYPE COMMUNICATION WIRE WINDER

(76) Inventor: Sheng-Hsin Liaom, Taipei Hsien (TW)

( * ) Notice: Subject to any disclaimer, the term of this patent is extended or adjusted under 35 U.S.C. 154(b) by 0 days.

(21) Appl. No.: 09/573,680

(22) Filed: May 19, 2000

(30) Foreign Application Priority Data

Sep. 17, 1999 (TW) .................................................. 88215976

(51) Int. Cl.$^7$ .................................................. B65H 75/48
(52) U.S. Cl. .................................... 242/378.1; 242/378.2; 242/378.3; 242/385.4; 191/12.2 R; 191/12.2 A; 191/12.4
(58) Field of Search ............................. 242/378.1, 378.2, 242/378.3, 385.4; 191/12.2 R, 12.2 A, 12.4

(56) References Cited

U.S. PATENT DOCUMENTS 4,646,987 * 3/1987 Peterson et al. .
6,082,656 * 7/2000 Thornton .
6,199,784 * 3/2001 Wang et al. .

* cited by examiner

Primary Examiner—Donald P. Walsh
Assistant Examiner—Jonathan R. Miller
(74) Attorney, Agent, or Firm—Rosenberg, Klein & Lee

(57) ABSTRACT

A micro-type communication wire winder includes a housing, a rotary disk, a buckling piece, a communication wire and a spiral spring. The rotary disk is pivotally installed in the receiving groove of the housing and one surface thereof is installed with an axle bush and an outer circular cover with slots for fixing and winding a communication wire. While another surface is installed with a ring protrusion for receiving and engaging a spiral spring or receiving the spiral spring in a cavity adjacent to the rotary disk so that the spiral spring can be wound around the ring protrusion. Thus, the communication wire has a rewinding force applied thereon. The rim of the rotary disk is further installed with a tilt buckling groove. A buckling piece at the side of the housing obliquely resists against the rim of the rotary disk. Therefore, as the communication wire is pulled out for a predetermined length, the rotary disk can be buckled in the buckling groove by the buckling piece so as to retain a predetermined length. Thus, the micro-type communication wire winder has a simple structure and can be produced easily and conveniently. The communication wire will not be intricate or in tension so as to be used conveniently.

15 Claims, 10 Drawing Sheets

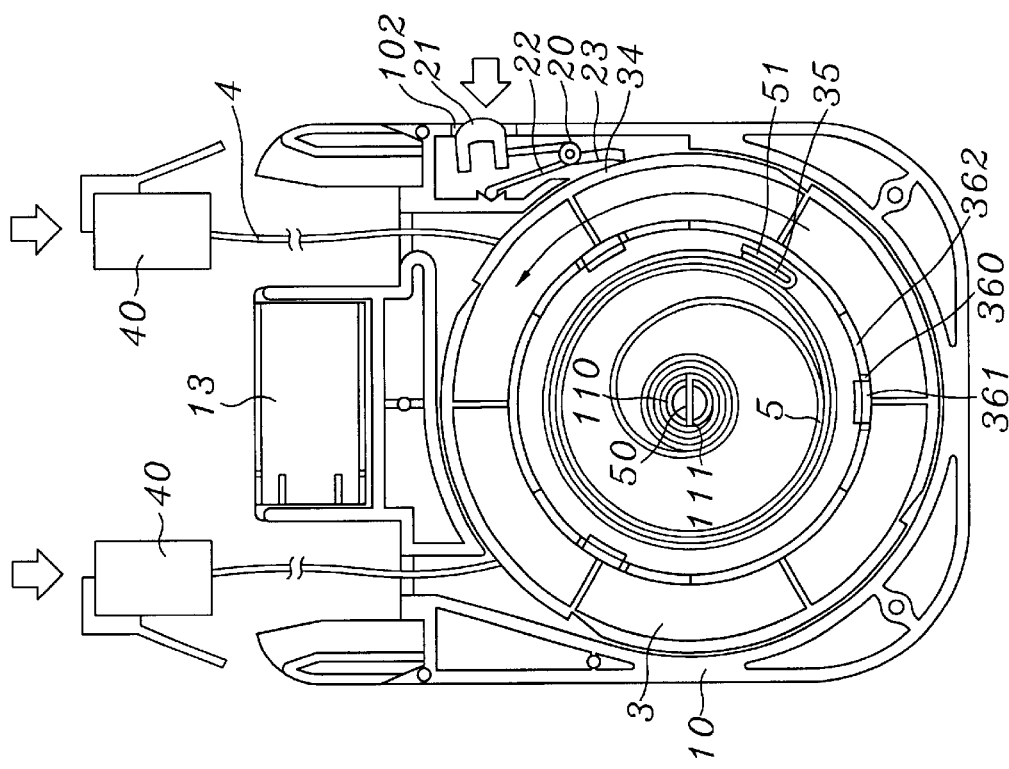
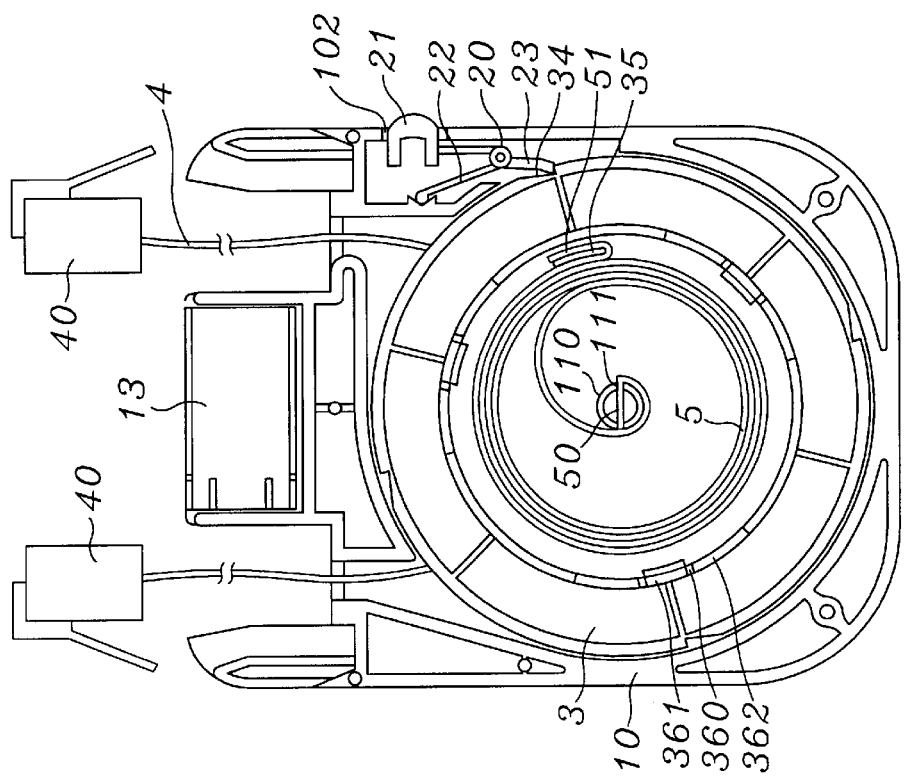

MICRO-TYPE COMMUNICATION WIRE WINDER

FIELD OF THE INVENTION

The present invention relates to a micro-type communication wire winder which has a simple structure and can be produced easily and conveniently. A desired length of a communication wire can be pulled from the winder then fixed. The communication wire may thus be maintained neatly, without being in tension.

BACKGROUND OF THE INVENTION

With the current prevalence of computers, modems, telephones, facsimile machines, and the like, communication wires are required to connect different devices. In order to prevent the communication wire from being too long or too short, various wire winders have been developed for winding such communication wires. The basic structure of known wire winders includes a housing, a rotary disk, a spiral screen, and a communication wire. The spiral screen pulls the rotary disk so that the communication wire wound around the rotary disk is biased by a restoring force. Since the communication wire must connect with two communication devices, the connection and conduction structure of the communication wire in the wire winder has many different designs. For example, a plurality of concentric and unequal diameter conductive rings are disposed on the rotary disk, while a plurality of conductive elastic pieces or steel balls are arranged on another rotary disc so that even during rotation, electric connection is maintained. These prior art designs require many components and a complicated structure which makes assembly more difficult, and makes it more likely that components will be arranged ineffectively. Moreover, since the spiral spring is often not arranged properly, the volume of the wound wire may be increased, heightening inconvenience in use and storage. Also, after the communication wire is pulled out from the prior art wire winder, it will be in tension due to the elastic force of the spiral spring and thus a proper length of the wire may not be left unwound. This proves quite troublesome to a user. Therefore, there is a need for a micro-type communication wire winder which addresses such prior art defects.

SUMMARY OF THE INVENTION

The object of the present invention is to provide a micro-type communication wire winder. The wire winder has a simple structure and can be produced easily and conveniently. A desired length of a communication wire can be pulled out and fixed at that length. A communication wire is maintained in a simple untensioned configuration.

In order to achieve the aforesaid object, a micro-type communication wire winder is disclosed. A rotary disk is pivotally installed in a receiving groove of a housing, and one surface thereof is installed with an axle bushing and an outer circular cover with slots for fixing and winding a communication wire. Another surface is installed with a ring protrusion for receiving and engaging a spiral spring or receiving the spiral spring in a cavity adjacent to the rotary disk so that the spiral ring can be wound around the protrusion. Thus, the communication wire is biased by a rewinding force. The rim of the rotary disk is further installed with a tilt buckling groove. A buckling piece at the side of the housing obliquely resists against the rim of the rotary disc. Therefore, as the communication wire is pulled out to a predetermined length, the rotary disk can be buckled in the buckling groove by the buckling piece so as to retain the predetermined length. As the buckling piece is pressed, the rotary disc is released and rewound.

The various objects and advantages of the present invention will be more readily understood from the following detailed description when read in conjunction with the appended drawings.

DESCRIPTION OF THE DRAWINGS

FIG. 5A shows a plan structure in which the communication wire is rewound so that the rotary disk is buckled by the buckling piece.

FIG. 5B shows a plan structure in the first embodiment of the present invention in which the buckling piece is pressed so that the rotary disk is released for rewinding the wire.

DETAILED DESCRIPTION OF THE PREFERRED EMBODIMENTS

Figure 1:
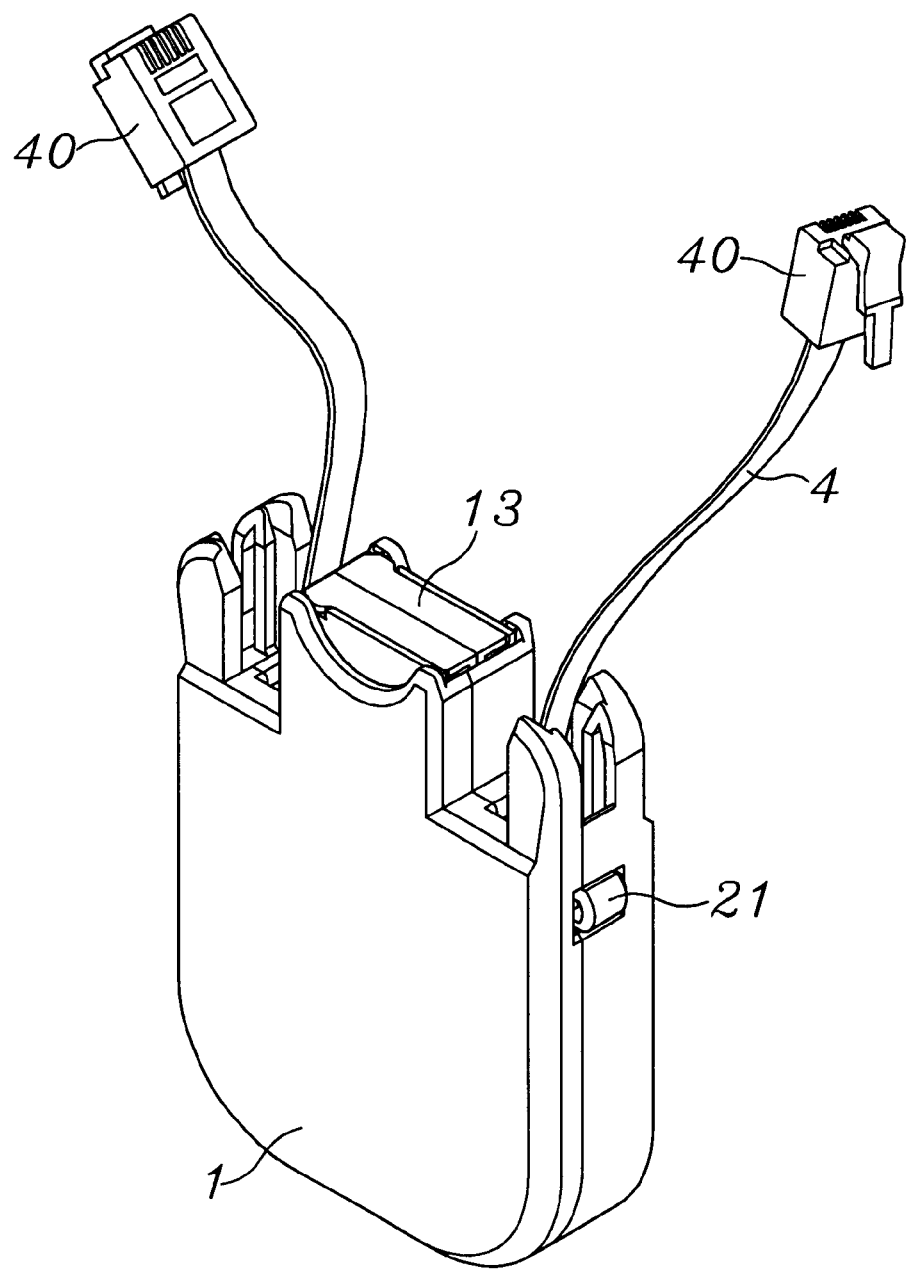
FIG. 1 is a perspective view of a first embodiment of the present invention.
Figure 2:
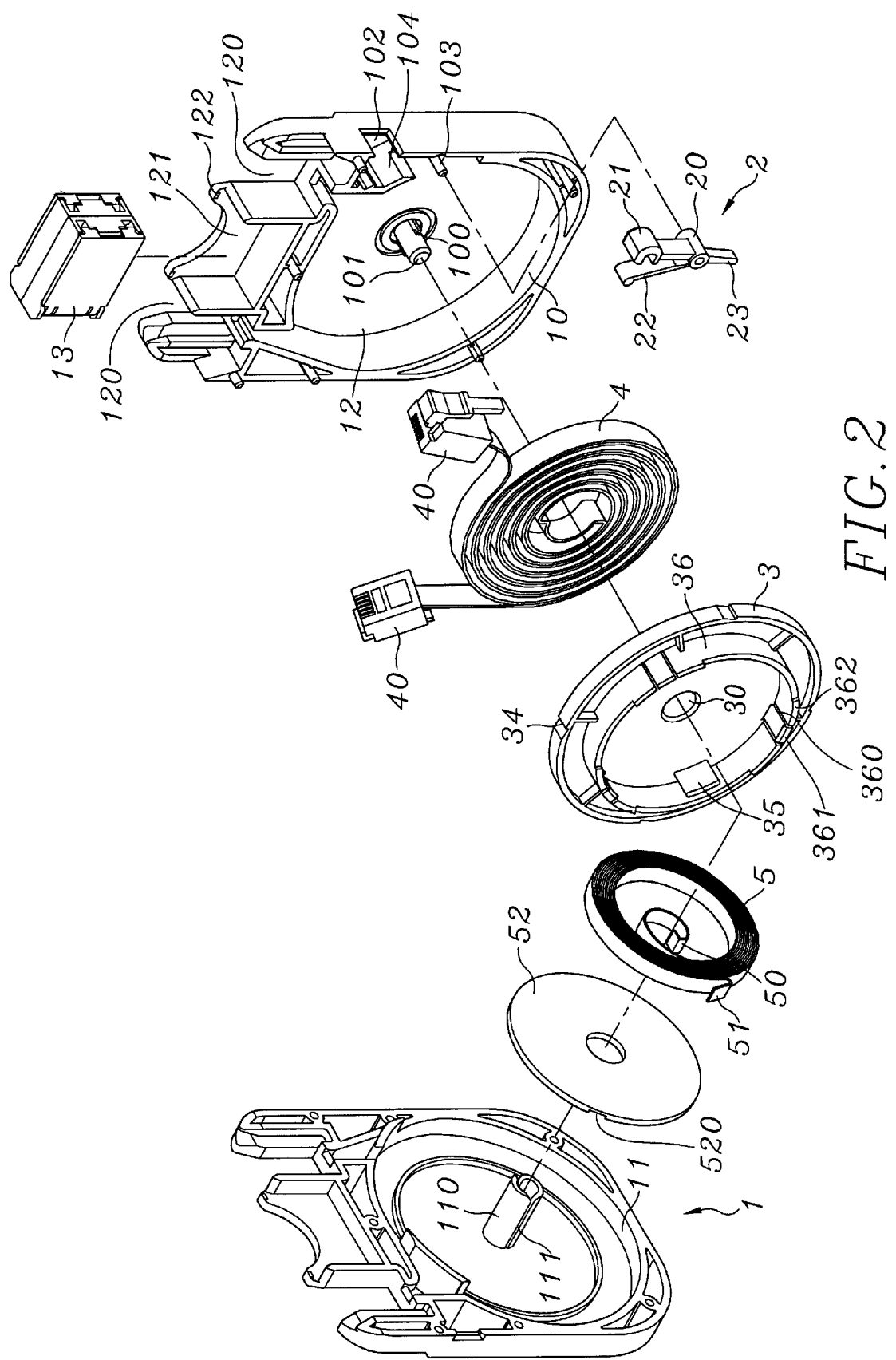
FIG. 2 is an exploded perspective view of the first embodiment of the present invention.

With reference to FIGS. 1 and 2, the assembled and exploded views of one preferred embodiment of the micro-type communication wire winder according to the present invention are illustrated. The communication wire winder includes a housing 1, a buckling piece 2, a rotary disk 3, a communication wire 4, and a spiral spring 5.

The housing 1 is formed by combining a first half housing 10 and a second half housing 11 to form a receiving groove 12 therebetween. The housing has two wire outlets 120. The lateral side thereof is installed with a groove 121 for receiving a communication adapter 13 which is positioned by a protrusion 122. The first half housing 10 has formed thereon a pivotal axle 101 having two lateral wings 100. A side portion of the first half housing 10 is formed with a via hole 102 and a pivotal rod 103. The buckling piece 2 engages the pivotal rod 103 through a pivotal cover 20 for rotation. The buckling piece 2 further has a press portion 21 that may be pressed by the user which extends through the via hole 102 (the press portion 21 may slightly protrude from the surface of the housing 1, or alternatively, a groove may be formed in the via hole 102 so that it will not protrude out of the surface of the housing, but remains sufficiently accessible to be pressed).

An elastic portion 22 extends inward to a stopper 104 formed on the first half housing 10 with respect to the press portion 21 for elastically restoring the press portion 21. A top buckle 23 capable of inserting into the receiving groove 12 and driving with the press portion 21 is installed at the pivotal cover 20 of the press portion 21.

A pivotal cover 110 capable of covering the pivotal axle 101 of the first half hosing 10 is installed at the center of the receiving groove of the second half housing 11. Slits 111 capable of being engaged by the lateral wings 100 are installed at two opposite sides of the pivotal cover 110.

Figure 3:
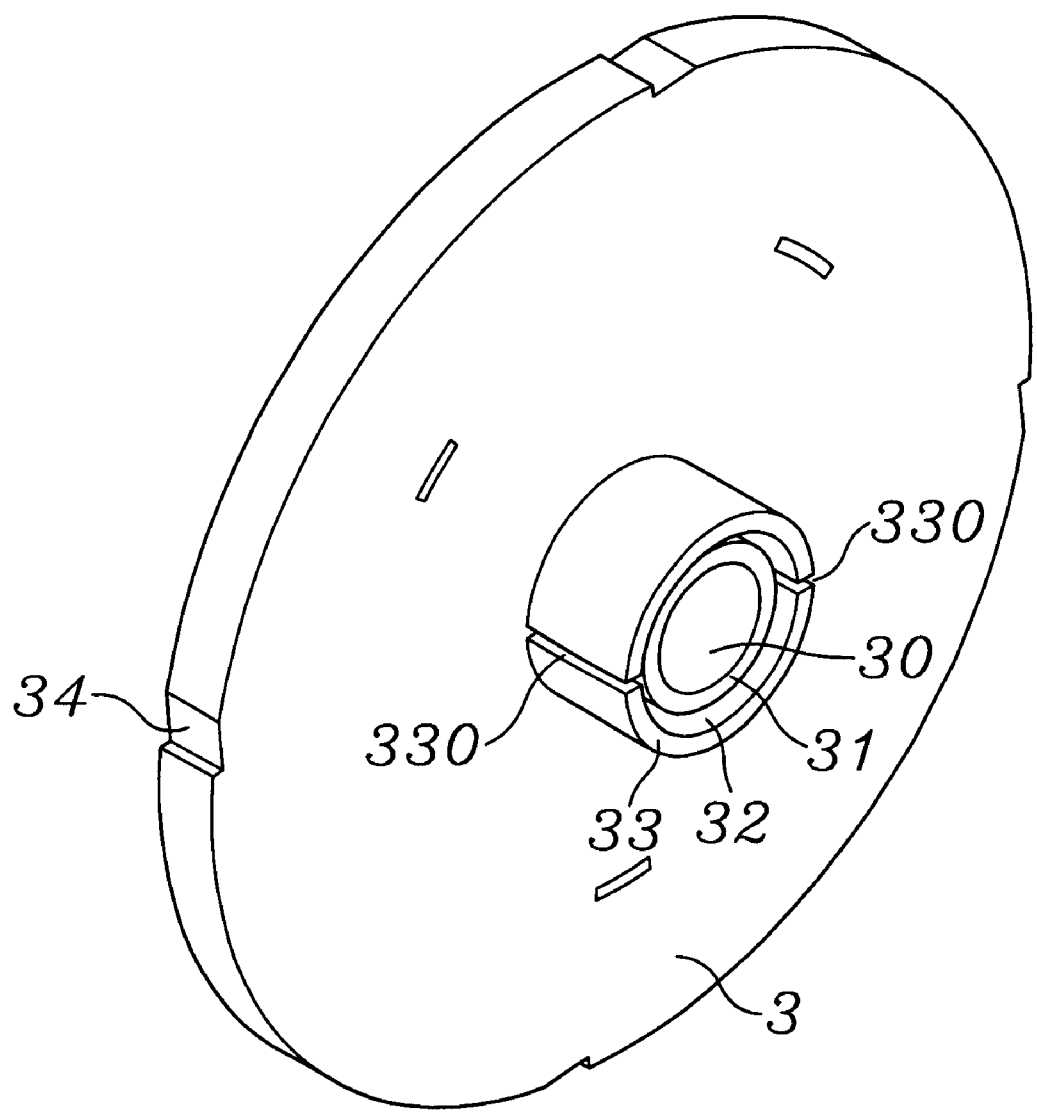
FIG. 3 is a lateral perspective view of the rotary disk structure in the first embodiment of the present invention.

The center of the rotary disk 3 is installed with a pivotal hole 30 into which the pivotal cover 110 pivotally inserts. As shown in FIG. 3, the axle bushing 31 extends from a first surface of the disk about the pivotal hole 30 toward the first half housing 10. An outer ring cover 33 with spaced slots 330 is formed about the axle bushing 31. A circular slit 32 is defined between the axle bushing 31 and the outer ring cover 33. Therefore, the communication wire 4 may be engaged with the slots 330 and the slit 32 so as to be fixed and wound around the outer ring cover 33, with each terminal plug 40 of the wire protruding out from a wire outlet 120, as shown in FIG. 1, 5A, and 5B.

A second surface of the rotary disk 3 is installed with a ring protrusion 36. At a predetermined portion of the ring protrusion 360 are formed a plurality of elastic hooks 361 defined by a plurality of parallel slots 360. Two flanges 362 are installed at two sides of each elastic hook 361.

The spiral spring 5 is hooked to the slit 111 of the pivotal cover 110 by the inner hooking end 50 and is fixed by the engagement of lateral wings 100, while the outer hooking end 51 is hooked to the hook piece 35 preinstalled at an inner side of the ring protrusion 36 of the rotary disk 3 for pulling the rotary disk 3.

Figure 4:
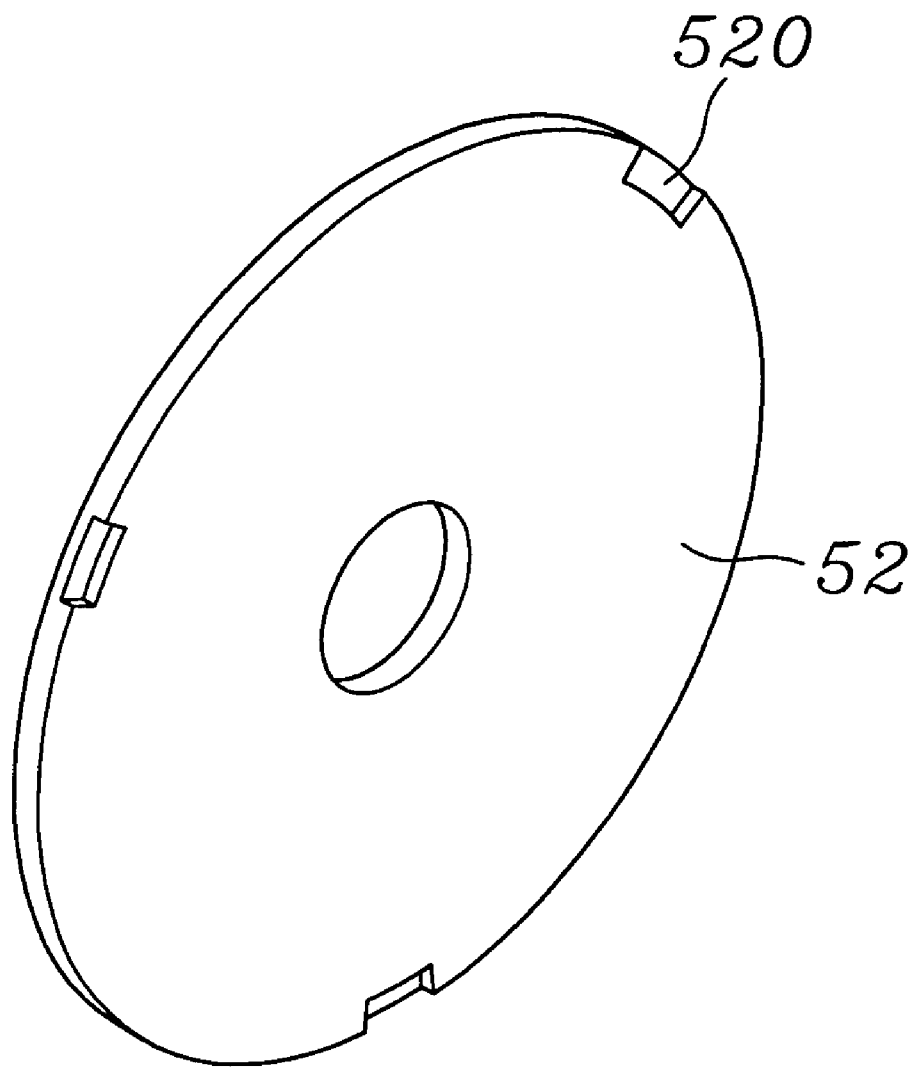
FIG. 4 is another lateral perspective view of a positioning disk in the first embodiment of the present invention.

A plurality of buckling grooves 520 formed in a positioning disk 52 (as shown in FIG. 4) are buckled by the elastic hooks 361. The positioning disk 52 is formed with an outer diameter slightly smaller than the inner diameter of the ring protrusion 36. The positioning disk 52 serves to capture the spiral spring so that it remains received in the ring protrusion 36, thus permitting the communication wire 4 of the rotary disk 3 to be rewound at any time.

When the rotary disk 3 is pivotally installed on the pivotal cover 110, the top buckle 23 of the buckling piece 2 elastically bears against the rim of the rotary disk 3 by the elastic force of the elastic portion 22. The outer periphery of the rotary disk 3 is further installed with at least one tilt buckling groove 34. Referring to FIG. 5A, when the communication wire 4 is pulled out so that the rotary disk 3 rotates clockwise relative to the orientation shown in the figure, it can rotate freely. However, once the communication wire 4 is released, the rotary disk 3 rotates counter-clockwise relative to the orientation shown in FIG. 5A. The top buckle 23 is thus biased to engage the buckling groove 34 so as to confine the rotary disk to rotation in only a single direction. Therefore, the pulled communication wire 4 is fixed at an exposed length. If the wire is desired to be rewound again, the user need only press the press portion 21, as shown in FIG. 5B. The top buckle 23 will then release from the buckling groove 34, and the rotary disk 3 is free to rewind the communication wire more rapidly.

By the aforesaid simple structure and precise space arrangement, a wire winder which functions to wind a communication wire 4 while permitting it to be pulled out as desired can be assembled easily and conveniently. Moreover, the size of the whole wire winder is reduced for use and storage. The wire winder can be used with any communication device.

Figure 6:
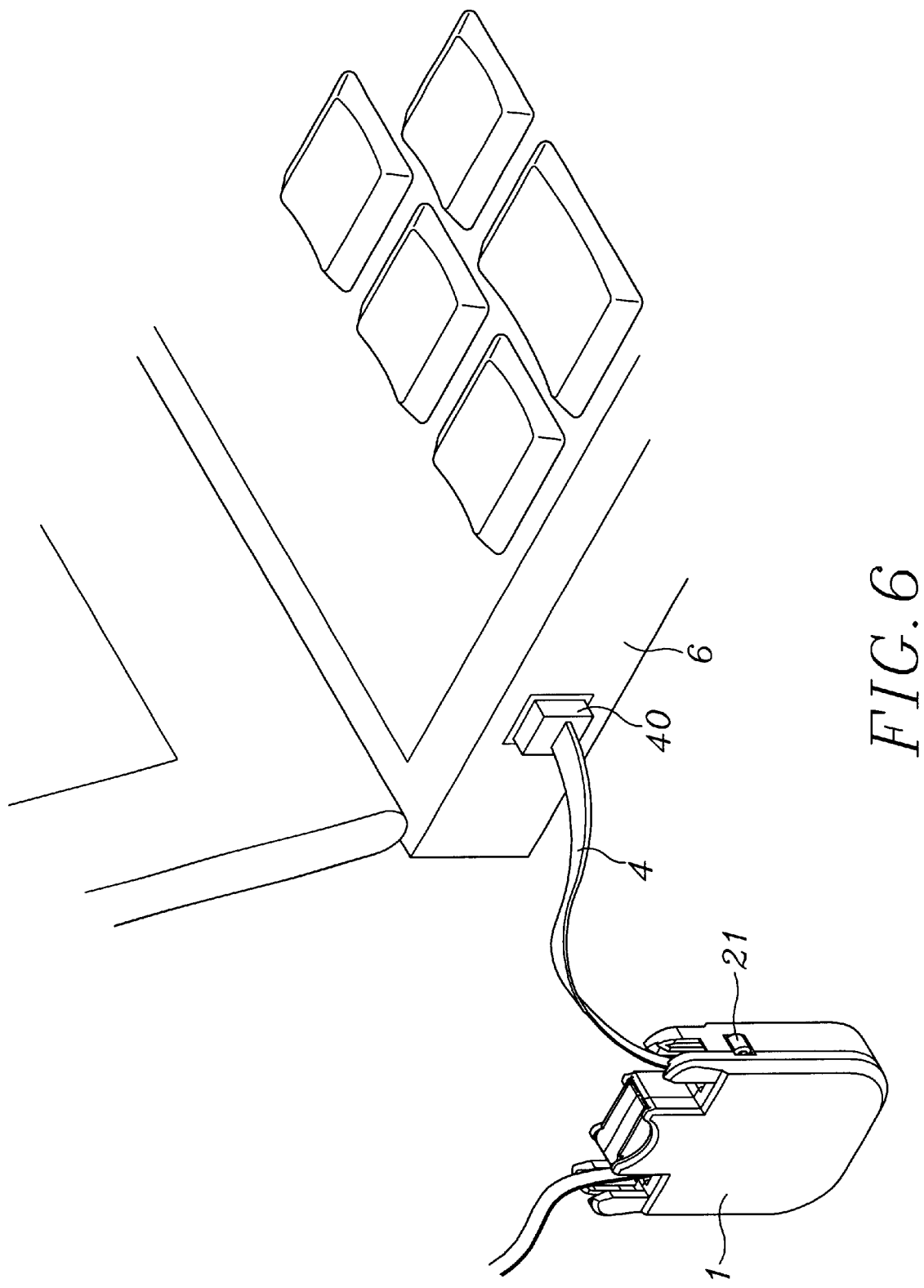
FIG. 6 shows an application in which an embodiment of the present invention is utilized with a notebook computer.

FIG. 6 shows an exemplary application, wherein a wire winder of the present invention is utilized with a notebook computer 6. As shown, a plug 40 of a communication wire 4 may be inserted into a computer mainframe, while another plug 40 may be inserted into a receptacle of a phone wire. The communication wire 4 will not be wound improperly even if it is extended to a very long length, nor will problems be induced by the elasticity of winding.

Figure 7:
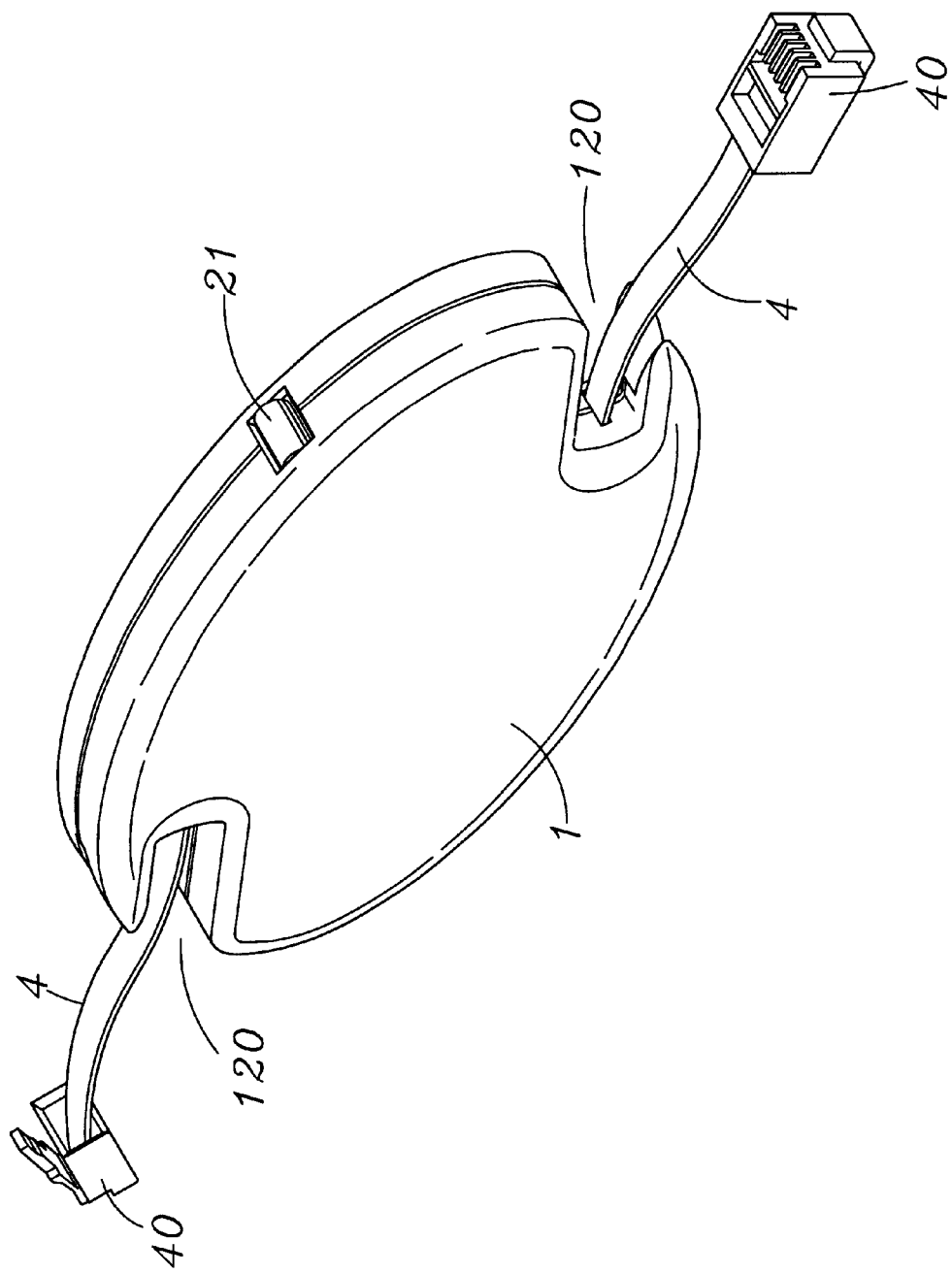
FIG. 7 is a perspective view of the second embodiment of the present invention.
Figure 8:
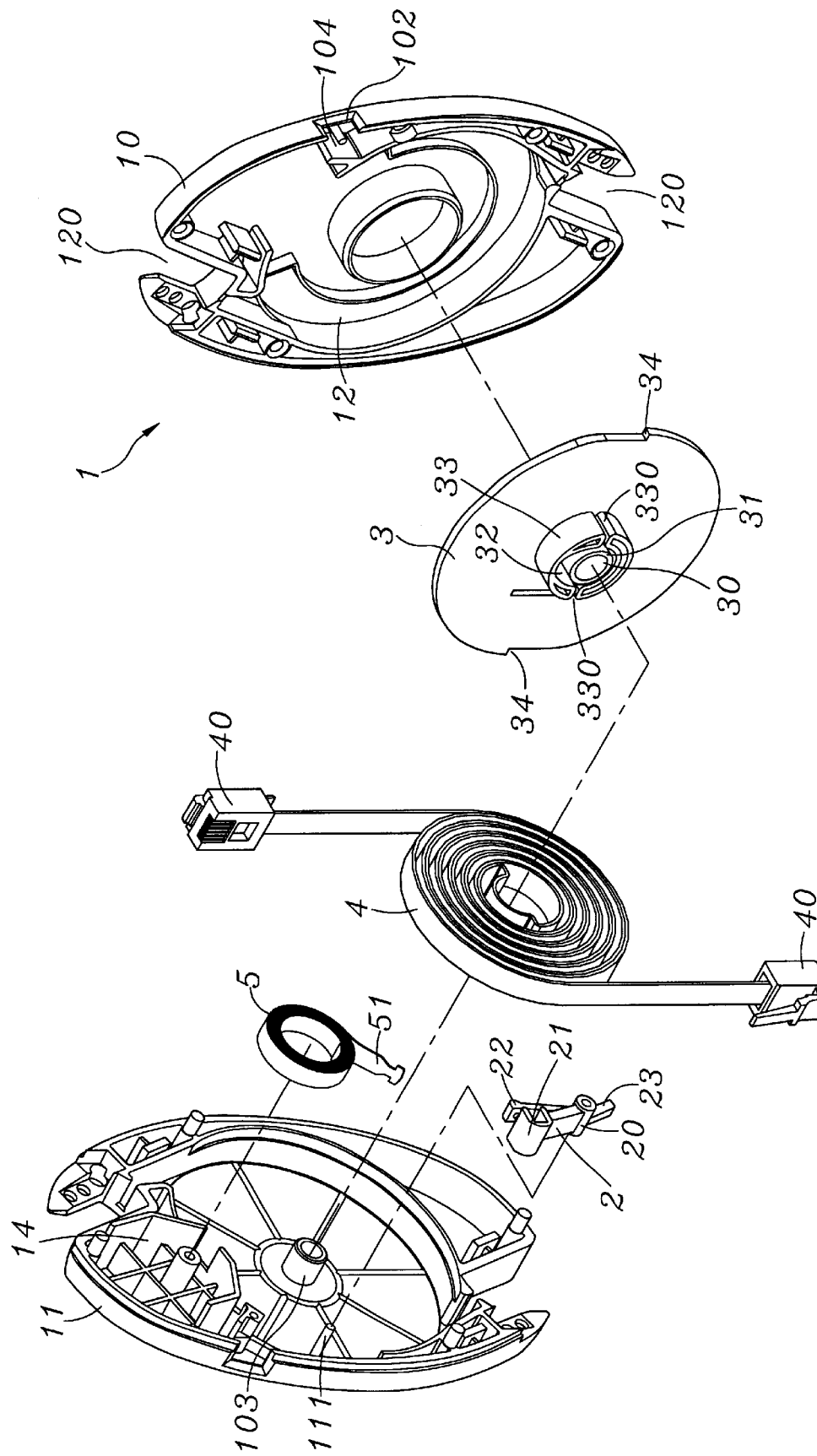
FIG. 8 is an exploded perspective view of the second embodiment of the present invention.
Figure 9:
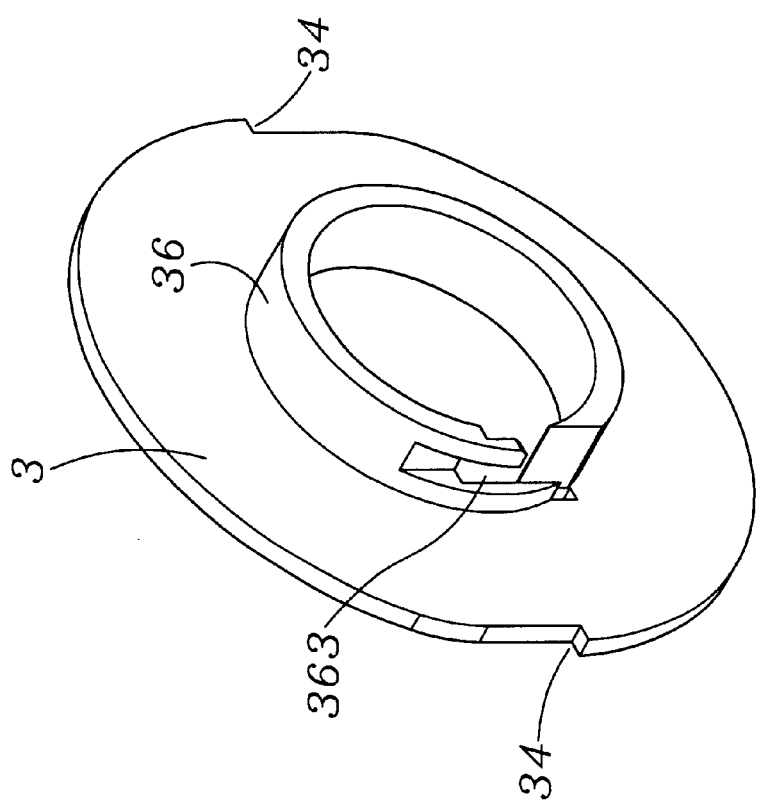
FIG. 9 is a perspective view showing a surface of the rotary disk in the second embodiment of the present invention.
Figure 10:
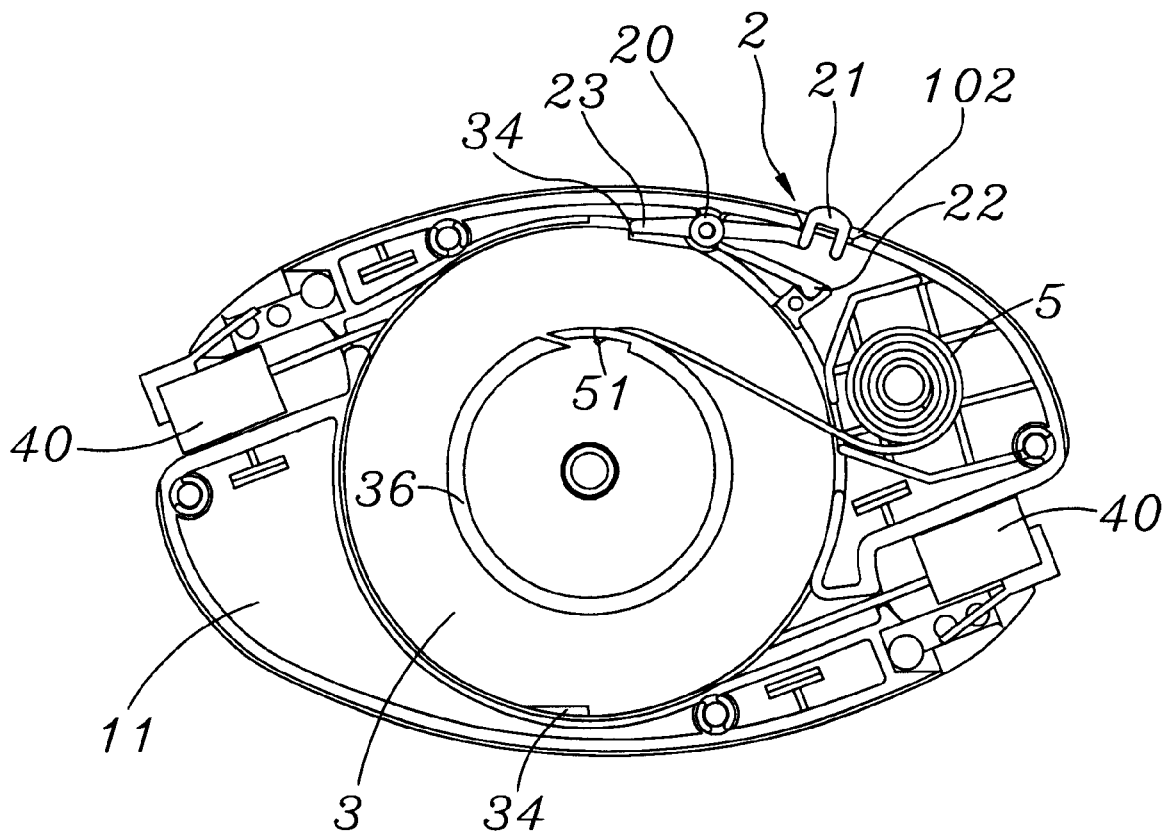
FIG. 10 is a structural plan view showing the second embodiment of the present invention in which a first half housing is removed.

Furthermore, in the aforesaid embodiment and structure, in order that the spiral spring 5 may be received in the rotary disk 3 offset from its axis of rotation, corresponding changes in structure are required in the housing 1 and rotary disk 3. FIGS. 7 and 8 accordingly show a second embodiment of the present invention. In the second embodiment, the spiral spring 5 is received in a cavity 14 formed at a position offset from the center of the rotary disk 3. It is necessary to form only one hook groove on the ring protrusion 36 (see FIG. 9). It is only necessary to hook the outer hooking end 51 of the spiral spring 5 to a hooking groove 363. Thus, as the rotary disk 3 rotates, the spiral spring will be wound around the ring protrusion 36, as shown in FIG. 10. Manufacturing and assembly may thus be simplified.

Although the present invention has been described with reference to the preferred embodiments, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A micro-type communication wire winder comprising:
    a housing having a receiving groove defined therein and including a pivotal post extending through said receiving groove, said housing having formed at a peripheral portion thereof a via hole and a plurality of wire outlets each communicating with said receiving groove;
    a rotary disk disposed in said receiving groove in pivotally displaceable manner, said rotary disk having formed therein a central pivotal hole engaging said pivotal post, said rotary disk including opposed first and second surfaces and a rim portion extending therebetween, said rim portion having at least one tilt buckling groove formed thereon;
    a communication wire wound about a portion of said rotary disk to be disposed adjacent said first surface thereof, said communication wire having first and second plug end portions respectively passing through said wire outlets;
    a spiral spring disposed adjacent said second surface of said rotary disk for resiliently biasing said rotary disk relative to said housing, said spiral spring having an outer hooking end engaging said rotary disk;
    an integrally formed buckling piece coupled to said housing to engage said rotary disk in resiliently biased manner, said buckling piece being pivotally displaceable about a pivot axis between first and second positions responsive to user manipulation, said buckling piece including elastic, top buckle, and press portions extending from a pivotal cover portion, said top buckle portion being biased pivotally about said pivot axis to engage said rim portion of said rotary disk responsive to said elastic portion resiliently engaging said housing, said press portion extending at least partially through said via hole for manipulation by a user;
    whereby said top buckling portion of said buckling piece is adapted in said first position to lockingly engage said tilt buckling groove of said rotary disk rim portion in said first position, and in said second position to disengage therefrom.

2. The micro-type communication wire winder as recited in claim 1 wherein said housing includes first and second housing halves, at least said first housing half having formed thereon adjacent said via hole: a pivotal rod and a stopper extending therefrom into said receiving groove, said pivotal rod being pivotally engaged by said pivotal cover portion of said buckling piece, said stopper supporting a terminal end of said elastic portion of said buckling piece.

3. The micro-type communication wire winder as recited in claim 1 wherein said housing includes first and second housing halves, at least said first housing half having a pivotal axle extending therefrom into said receiving groove, at least said second housing half having a pivotal cover extending therefrom to coaxially engage said pivotal axle of said first housing half, said first housing half pivotal axle having a pair of radially extending wings, said second housing half pivotal cover having a pair of slits formed to extend axially therein.

4. The micro-type communication wire winder as recited in claim 3 wherein said spiral spring and rotary disk pivotally engage said second housing half pivotal cover, said spiral spring having an inner hooking end retentively engaging at least one of said slits of said second housing half pivotal cover.

5. The micro-type communication wire winder as recited in claim 4 wherein said rotary disk includes a hook piece extending from said second surface toward said second housing half.

6. The micro-type communication wire winder as recited in claim 1 wherein said rotary disk includes an axle bushing extending from said first surface about said central pivotal hole, and an outer cover formed on said first surface to extend annularly substantially about said axle bushing, said outer cover being radially spaced from said axle bushing by an annular groove and having formed therein at least a pair of axially extended slots, said communication wire passing through said annular groove and said slots.

7. The micro-type communication wire winder as recited in claim 1 wherein said rotary disk includes a ring protrision extending from said second surface, said ring protrusion peripherally describing a compartment for receiving at least a portion of said spiral spring.

8. The micro-type communication wire winder as recited in claim 7 wherein said ring protrusion has formed thereon a plurality of elastic hooks each defined by a pair of axially extended slots spaced one from the other.

9. The micro-type communication wire winder as recited in claim 8 further comprising a positioning disk coupled to said ring protrusion to substantially cover said compartment, said positioning disk being buckled by said elastic hooks to capture said portion of said spiral spring within said compartment.

10. The micro-type communication wire winder as recited in claim 9 wherein said positioning disk has formed thereon a plurality of buckling grooves, each said buckling groove releasably engaging one said elastic hook of said rotary disk ring protrusion.

11. The micro-type communication wire winder as recited in claim 9 wherein said ring protrusion has formed thereon a plurality of flanges disposed adjacent said slots.

12. The micro-type communication wire winder as recited in claim 1 wherein said housing has formed thereon a groove for receiving a communication adapter.

13. A micro-type communication wire winder comprising:

a housing having a receiving groove defined therein and including a pivotal post extending through said receiving groove, said housing having formed at a peripheral portion thereof a via hole, a plurality of wire outlets, and a cavity each communicating with said receiving groove, said cavity being offset from said pivotal post;

a rotary disk disposed in said receiving groove in pivotally displaceable manner, said rotary disk having formed therein a central pivotal hole engaging said pivotal post, said rotary disk including opposed first and second surfaces and a rim portion extending therebetween, said rim portion having at least one tilt buckling groove formed thereon, said rotary disk including a ring protrusion formed on said second surface, said ring protrusion having a hooking groove formed therein;

a communication wire wound about a portion of said rotary disk to be disposed adjacent said first surface thereof, said communication wire having first and second plug end portions respectively passing through said wire outlets;

a spiral spring received in said cavity of said housing for resiliently biasing said rotary disk relative to said housing, said spiral spring having an outer hooking end engaging said ring protrusion of said rotary disk;

an integrally formed buckling piece coupled to said housing to engage said rotary disk in resiliently biased manner, said buckling piece being pivotally displaceable about a pivot axis between first and second positions responsive to user manipulation, said buckling piece including elastic, top buckle, and press portions extending from a pivotal cover portion, said top buckle portion being biased pivotally about said pivot axis to engage said rim portion of said rotary disk responsive to said elastic portion resiliently engaging said housing, said press portion extending at least partially through said via hole for manipulation by a user;

whereby said top buckling portion of said buckling piece is adapted in said first position to lockingly engage said tilt buckling groove of said rotary disk rim portion in said first position, and in said second position to disengage therefrom.

14. The micro-type communication wire winder as recited in claim 13 wherein said housing includes first and second housing halves, at least one of said first and second housing halves having formed thereon adjacent said via hole a pivotal rod extending into said receiving groove, said pivotal rod being pivotally engaged by said pivotal cover portion of said buckling piece.

15. The micro-type communication wire winder as recited in claim 13 wherein said rotary disk includes an axle bushing extending from said first surface about said central pivotal hole, and an outer cover formed on said first surface to extend annularly substantially about said axle bushing, said outer cover being radially spaced from said axle bushing by an annular groove and having formed therein at least a pair of axially extended slots, said communication wire passing through said annular groove and said slots.

* * * * *